United States Patent
Nadasi et al.

[11] 3,926,471
[45] Dec. 16, 1975

[54] CONSTRUCTION AND PROCESS FOR ORNAMENTAL CAR TOP

[75] Inventors: Laszlo Nadasi; Marton Nadasi, both of Flushing; John Zelenko, Flint; Donald E. Pero, Swartz Creek, all of Mich.

[73] Assignee: City Auto Upholstering Co., Flint, Mich.

[22] Filed: May 15, 1974

[21] Appl. No.: 470,219

[52] U.S. Cl. ............ 296/137 R; 150/52 K; 296/145
[51] Int. Cl.² ........................................ B62D 25/06
[58] Field of Search ...... 296/136, 137 R, 95 C, 145, 296/146; 52/DIG. 4, 22; 150/52 K

[56] References Cited
UNITED STATES PATENTS

| | | | |
|---|---|---|---|
| 2,639,751 | 5/1953 | Flaherty | 296/95 C |
| 3,124,501 | 3/1964 | Wise | 52/DIG. 4 |
| 3,309,129 | 3/1967 | Newman et al. | 52/DIG. 4 |
| 3,328,073 | 6/1967 | Einhorn | 296/136 |
| 3,501,196 | 3/1970 | Megargle et al. | 296/145 |
| 3,763,908 | 10/1973 | Norman | 150/52 K |

FOREIGN PATENTS OR APPLICATIONS
672,515  10/1964  Italy .................... 296/137 R Primary Examiner—Robert J. Spar
Assistant Examiner—Gary Auton
Attorney, Agent, or Firm—Hauke, Patalidis & Dumont

[57] ABSTRACT

A separately fabricated unit is predesigned to fit different basic body designs of the various car manufacturers. The unit includes magnetic holding strips incorporated within the preformed vinyl shell for the ornamental car top. The various layers of insulation and ornamental cover are all fabricated into a unitary assembly prior to installation on a car. In the installation, because of the holding strength afforded on the interior part of the shell by the magnetic holding strips, only two anchoring bolts are required, and only two actual openings need be made in the car body itself. Additional holding force is provided by the structure whereby one or more opera-type windows are formed with crimping edges at either side of the car top. These edges are designed to fit over the standard car windows and assist in holding the car top in place.

5 Claims, 10 Drawing Figures

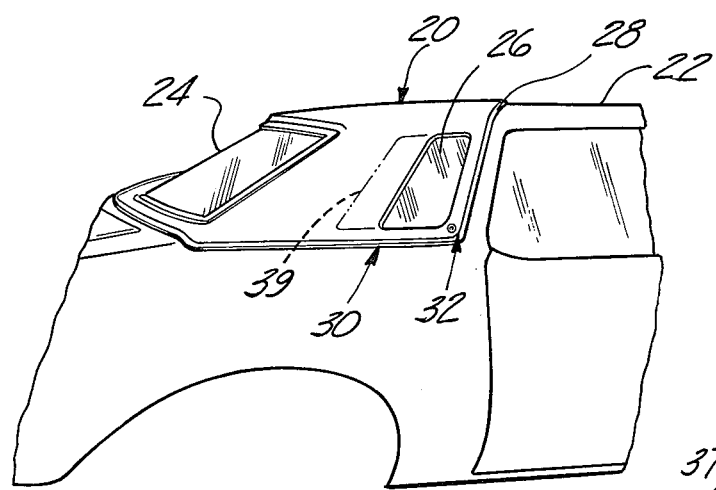
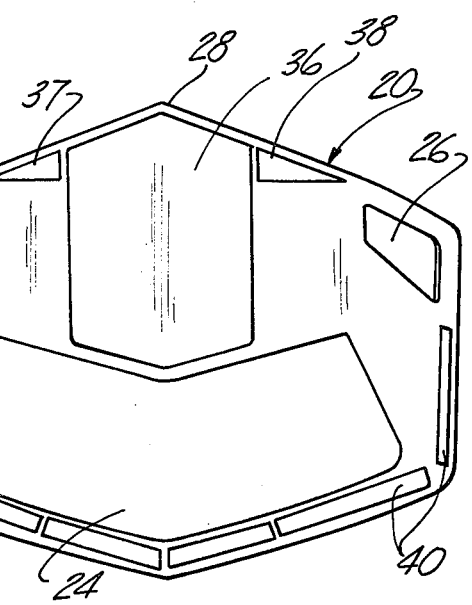
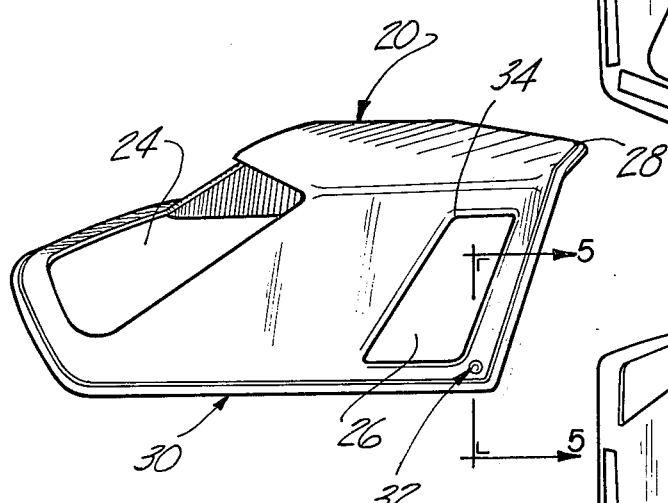
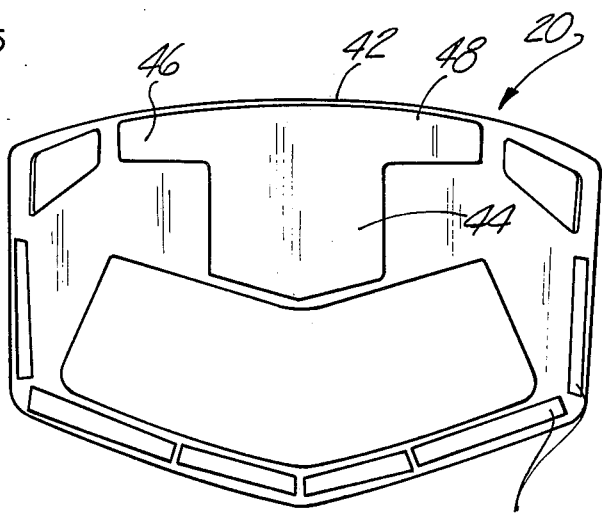
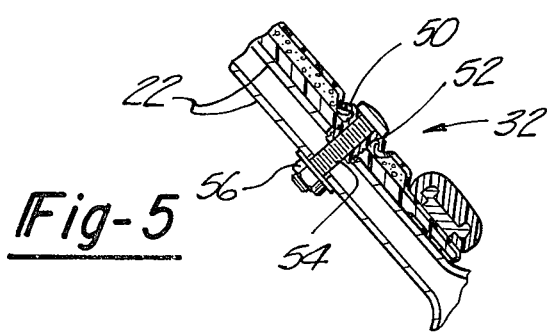

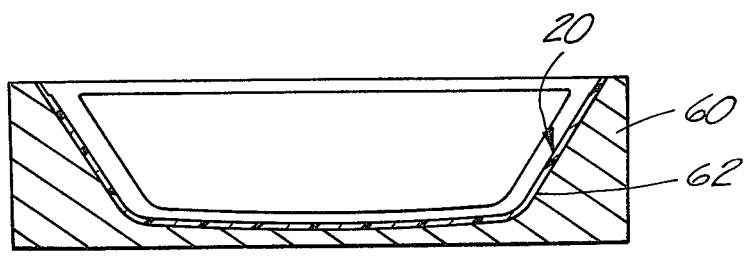
Fig-6
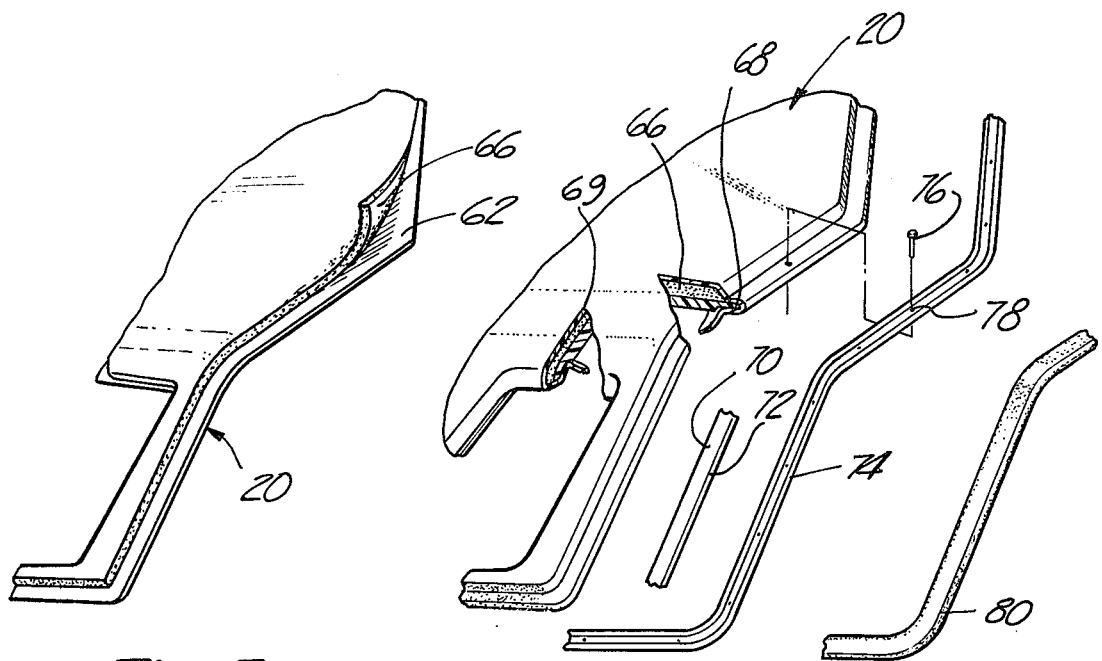
Fig-7
Fig-8
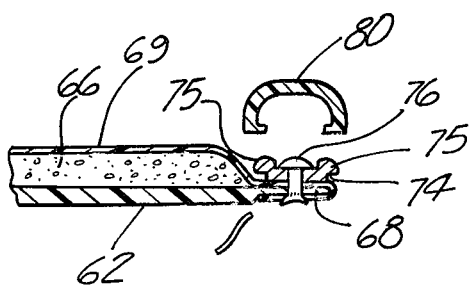
Fig-9
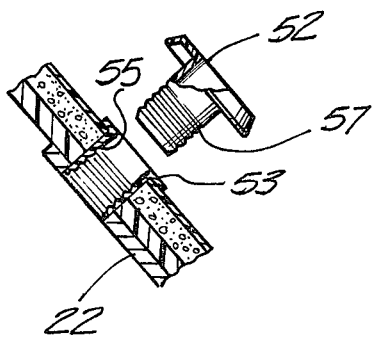
Fig-10

3,926,471

CONSTRUCTION AND PROCESS FOR ORNAMENTAL CAR TOP

BACKGROUND OF THE INVENTION

This invention relates generally to an ornamental car top which is prefabricated and readily installed on any standard shape and size auto body. A problem exists in customizing automobiles, particularly by application of car tops which ornament the rear portion of the body and top and use an ornamental fabric and in some cases reduced size or opera-type windows. Typical installations of ornamental car tops cannot be performed on the regular car assembly lines in the automobile factories. Such landau-type ornamental car tops are built step by step and glued, or otherwise directly fastened with a great number of fasteners, to the body itself in such manner that the ornamental car top becomes an integral part of the body of the car and cannot be changed or removed if this should be desired.

The present invention incorporates a number of advantages in that a number of ornamental car tops of different color or, for example, of different configuration may be used on any standard body design of current manufacture. Furthermore, such car tops may be removed or changed within 1 or 2 minutes simply by the removal and insertion of only two fasteners which are required to hold it in tight secure engagement with the automobile. At the present time, installations of these ornamental car tops are made in custom shops so that the car may be tied up for as long as several weeks while an individual cut, fit, gluing and fastening job is done on each automobile. This, of course, increases the cost and to some degree affects the beauty of the finished product as well as requiring substantial alteration of the body in such manner that leakage, etc. may result should the top become perforated or ripped.

The present invention relates to a unitary car top which by reason of its construction forms a protective integrated structure impervious to leakage and with a greatly improved fastening and anchoring means to hold the top to the car body in a manner not known to the prior art. Incorporation of the present invention in the ornamental car top field will serve to substantially reduce both the lead time and installation time for such tops and further to greatly reduce the cost and increase the desirability of such units by making them interchangeable at the will of the car owner.

SUMMARY OF THE INVENTION

The present invention relates to a preformed magnetically held ornamental car top which is fabricated to fit any one of three or four basic body shells made by each of the larger automobile manufacturers. It is installable or removable without special tools or without special skill by the car owner himself. Because of the process by which it is made and the final construction incorporated in the car top, it is a solid, completely waterproof, unitary construction which adds to the appearance and structural integrety of the car. Additionally, the features which provide for an improved anchoring structure to the car yet allow ready removability of the unit represent a substantial advancement over the prior art devices.

BRIEF DESCRIPTION OF THE DRAWINGS

Reference is made to the accompanying drawings in which like numerals are used to refer to like parts as they may occur throughout several different views of the drawings, and wherein:

FIG. 1 is a partial perspective view of an automobile having installed on it an ornamental car top according to the present invention;

FIG. 2 is a further perspective view of the car top removed from installation on the body and somewhat angularly displaced to better indicate the peripheral configuration of the car top;

FIG. 3 is a top elevational view of the car top in reverse or inverted position to show its undersurface and the several openings in it which provide window openings;

FIG. 4 is a view substantially similar to FIG. 3 but showing a somewhat different pattern of magnetic stripping used to apply holding forces between the car top and the top of the car body;

FIG. 5 is a fragmentary view of a portion of the car top and the car body indicating one type of fastening means used for holding it in place;

FIG. 6 illustrates the original forming or casting step in the process according to the present invention;

FIGS. 7 through 9 illustrate schematically the several different steps of the inventive process; and FIG. 10 illustrates the final step which occurs during installation of the car top to the automobile body.

DETAILED DESCRIPTION OF THE PREFERRED EMBODIMENT

Now with reference to FIG. 1, there is shown mounted in place a car top 20. The car top 20 it will be seen covers the upper rear section of the car 22 to which it is attached as an ornament. It will be understood that the car top 20 includes a rear window portion 24 and a pair of side window portions 26 which are adapted to mate with, or at least partially align with, the regular car windows provided in the car 22. The side rear windows 26 provided in the car top 20 may be of any ornamental design or shaping and in some cases are substantially smaller than the inner car windows to give an "opera-type" window appearance which enhances the attractiveness of the car top. The car top 20 further includes at its upper forward edge a pointed end portion 28 which will be better seen hereinafter in FIG. 3. The car top 20 further includes an ornamental edging construction, denoted by the numeral 30, and a pair of fasteners located in each case at the lower forward portion of the car top and denoted by the numeral 32. The detail of the construction of the fastener 32 is best shown in FIG. 5 hereinafter.

It will be understood that the inner surface of the car top 20 is formed with a contour closely complementary to that of the body of the car 22 to insure the closest and best possible fit. The side windows 26 further include an inwardly crimped edge portion extending around the edges of the window 26 and indicated generally by the numeral 34. It is the purpose and function of this inwardly bent edge portion to grip one or more of the opposed inner side window edges of the car 22. Optionally, the window portion 26 of the car top 22 may be smaller than or coextensive with the inside car window 39. In the event the car top window 26 is smaller, then only the upper forward and lower inwardly bent edge portions 34 will be in holding engagement with the inner car window 39.

FIG. 3 shows the concave inner surface of a car top 20 and the side window openings 26 together with the large rear window opening 24. A plurality of premagnetized material adhesive strips are mounted at particular locations on the inside surface of the car top 20. The first of these is a relatively large strip 36 with a forward edge portion conforming to the outline of the pointed edge 28 of the car top itself. It will further be seen that the strip 36 extends at the ridge of the car top 20 longitudinally across substantially all of the length of the car top itself. Extending laterally to the right and to the left of the strip 36 are a second pair of marginally located pointed strips 37 and 38 which serve to provide an additional holding force as between the car top 20 and the opposed surface of the body of the car 22. A further plurality of strips 40, likewise of magnetized material, are placed at spaced intervals about the margin of the car top 20 to hold its edges in place against the car body.

While a pointed car top 28 is preferred because of its holding ability relative to the car body, it is also possible to have a substantially straight forward portion such as is shown in FIG. 4. The front edge 42, in a like manner to the embodiment of FIG. 3, has attached to it a large holding strip 44 again with laterally extending holding portions 46 and 48 extending along the forward edge 42 of the car top 20. A further plurality of marginal edge portions 40 are likewise included at the inner surface of the car top 20 to add to its holding engagement with the car body.

FIG. 5 shows the detail of the fastener 52 used to attach the car top 20 to the body of the car 22. Included are an outer ornamental snap ring 50, an inner sleeve 52, a bolt 54 extending through the opposed portion of the car 22, and a nut 55. The fastener 52 is used to attach the assembly in place firmly at the two anchoring points. It will be understood that a variety of other commercial fasteners may be used in place of the bolt type fasteners shown in FIG. 5. An example of a different embodiment of the fastener will be shown in FIG. 10 hereinafter.

FIGS. 6–10 illustrate the steps involved in the process of forming a car top according to the present invention. In the first step, a female-type mold 60 is used to cast the body 62 of the car top 20. After preforming the body 62 of the car top, it is removed preparatory to the next step as is shown in FIG. 7. The car top body 62 is preferably formed of a fiberglass or like material which is relatively low in cost, light in weight and easy to form by the method shown. The next step comprises applying the adhesive magnetic strips on the inside surface of the car top 20, in a pattern as shown for example in FIGS. 3 and 4.

FIG. 7 illustrates the next following step in which a layer of insulating material 66 is applied over the outer surface of the car top body 62 and held in place through a suitable adhesive.

The next following sequence of steps are illustrated by the spread perspective showing of FIG. 8. It will be seen from the cross-sectional view that there is provided a cut-away step 68 which extends around the inside margin of the car top 20. The next layer, which comprises a vinyl or like fabric sheet 69 of selected color or design, is then applied. The edges of the sheet 69 are wrapped around the step 68 and the excess trimmed. The edges are then attached to the step 68 by an adhesive and in this manner the inside of the car top 20 is provided with a flush surface. There is also shown a plastic-type decorative edging strip 70 which includes a colored trim bead 72 around its periphery. Optionally, this bead may be applied around the lower edge of the car top 20. In order to complete the binding together of the parts of the car top 20, a metallic rim 74, which is fabricated of a shape designed to fit around the periphery of the car top 20, is used. A plurality of fasteners such as, for example, pop rivets 76 are used to hold the metallic rim 74 in place. A plurality of openings 78 are predrilled through the rim 78 or, alternately, drilled at the same time through the rim and the periphery of the car top 20.

As shown at the far right side of FIG. 8, a final molding such as molding 80 is then snapped over the extending edges 75 formed in the metallic rim 74 so as to cover the pop rivets 76.

The construction of the final molding is shown through the cross-sectional view in FIG. 9. It will thus be seen that the pop rivets 76 hold in place the metallic rim 74, the upper fabric sheet 69 and the step 68 formed at the edge of the precast body 62. The final step in the process is the attachment of the car top 20 to the body of the car 22. The location of the fastener relative to the car top 20 and the body 22 is best shown in FIGS. 1 and 2. A fastener such as the bolt 54 and nut 56 is shown in FIG. 5, while an alternate fastener is shown in FIG. 10. In an alternate method of attachment of the car top to the body of the car 22, the fastening may be through a plurality of metal screws used in place of several of the pop rivets 76. In this construction, several spaced metal screws are passed into holding engagement in openings in the car body 22. The pair of bolt 54 and nut 56 fasteners may then be eliminated.

In the FIG. 10 embodiment of the fastener 52, there is included an outer ring 53 and an inner threaded sleeve 55 which is engageable with the threads of a bolt 57. When the bolt 57 is threaded into the internally threaded sleeve 55, the parts are displaced outwardly, that is, expanded into tight holding engagement with the predrilled hole through the car top 20 and the aligned predrilled hole formed in the sheet metal of the body of the car 22. With this type of fastener, there is no requirement for an inner fastener nut, such as the nut 56, shown in FIG. 5.

It will thus be seen that the present invention includes both a new and improved construction for ornamental car tops and further a novel and improved process for fabricating and attaching such tops to the body of a car.

What is claimed is:

1. An ornamental top for use on a car with a metallic roof, side windows, and a rear window comprising:
  a preformed body having an internal contour complementary with the rear portion of the car roof, said top further having side window portions on each side and an open window portion at its rear, said side window portions contain window openings which are of a size substantially less than the windows at the rear portion of the car body and wherein at least one inwardly extending crimping edge is cast in said car top, said edge engageable in tight holding engagement with said windows of said car, and wherein the rear open window portion of said ornamental car top includes a margin portion extending inwardly and operable to overlap at least a portion of an opposed chrome rim portion on the car body;

a magnetic holding strip mounted on the inner surface of said top protimate its forward margin and engageable with the upper surface of the metallic car body for holding it securely thereon; and a plurality of fastening means, each insertable through said top and into holding engagement with openings in the body of the car, said fastening means comprise a pair of fasteners, each located at opposite sides of said car top, each of said fasteners extending through the forward lower edge portion of the car top.

2. The combination as set forth in claim 1 wherein a further plurality of magnetic holding strips are included about the lower margin of the car top further in holding engagement with the metallic portions of the body of the car juxtaposed thereto.

3. The combination as set forth in claim 1 wherein said magnetic holding strips comprise an adhesive strip material impregnated with premagnetized ferromagnetic particles, said strips selectively applied in a pattern proximate the inner margin of the car top.

4. The combination as set forth in claim 1 wherein said strip includes a substantially T-shaped portion mounted on the inner forward surface of said top, said T-shaped portion including a pair of laterally extending strips extending along the forward edges of the car top and a central relatively broad portion mounted at the forward tip of the ornamental top and further extending longitudinally for substantially the entire length of the opposed upper body of the car.

5. The combination as set forth in claim 1 wherein said fastening means further including an outer rim, an internally threaded sleeve extending through said top into the metallic portion of the car and a threaded means for threadably engaging and expanding said sleeve to anchor the car top securely to the automotive body.

* * * * *